United States Patent [19]
Morrison

[11] 3,921,944
[45] Nov. 25, 1975

[54] INFLATABLE SAFETY PACK

[75] Inventor: Barclay Morrison, Morristown, N.J.

[73] Assignee: John J. McNamara, Jr., New York, N.Y.

[22] Filed: Mar. 13, 1972

[21] Appl. No.: 234,239

[52] U.S. Cl. .......................... 244/138; 2/2; 244/143
[51] Int. Cl.² ............................................. B64D 17/78
[58] Field of Search ........ 244/138 R, 140, 141, 148, 244/146, 149, 137 R, 137 P, 143; 188/1 C; 2/2, 2.1 R, 2.1 A, DIG. 3, 1; 280/150 AB; 182/4, 5

[56] References Cited
UNITED STATES PATENTS

| | | | |
|---|---|---|---|
| 1,042,327 | 10/1912 | Costanzo | 9/333 |
| 1,640,270 | 8/1927 | Furman | 244/143 |
| 2,721,048 | 10/1955 | Warden | 244/138 R |
| 2,850,291 | 9/1958 | Ziccardi | 280/150 AB |
| 2,944,771 | 7/1960 | Bush | 244/138 R |
| 3,243,822 | 4/1966 | Lipkin | 2/2 |
| 3,286,951 | 11/1966 | Kendall | 244/138 R X |
| 3,330,510 | 7/1967 | Johnson | 244/138 R |
| 3,336,045 | 8/1967 | Kobori | 280/150 AB |
| 3,438,601 | 4/1969 | McIntyre | 244/138 R |
| 3,768,761 | 10/1973 | Cramer | 244/148 X |

*Primary Examiner*—Trygve M. Blix
*Assistant Examiner*—Barry L. Kelmachter
*Attorney, Agent, or Firm*—Kenyon & Kenyon Reilly Carr & Chapin

[57] ABSTRACT

An inflatable safety pack adapted to be worn by a person or otherwise attached to an object so that in the event of falling, upon impact the inflatable portion of the pack absorbs the resultant impact forces. The inflatable portion is housed within a frangible container and includes a plurality of sections which are preformed and coupled to one another so that upon inflation they act to encapsulate the person or object. A gaseous fluid is routed into each of the sections via check valves which maintain the desired pressure therein. An acceleration force responsive device is provided to automatically activate the device as well as additional features more fully explained herein.

14 Claims, 10 Drawing Figures

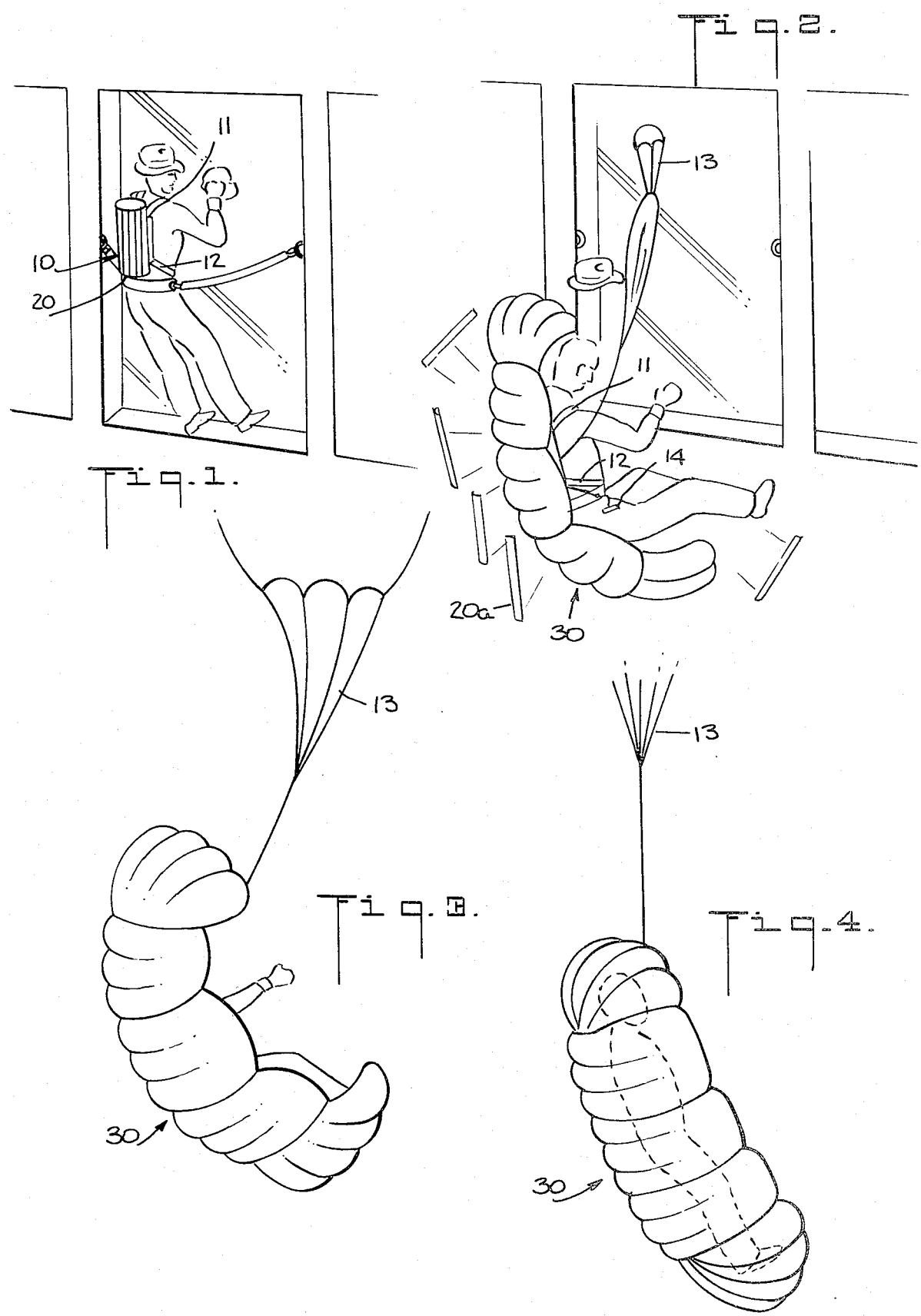

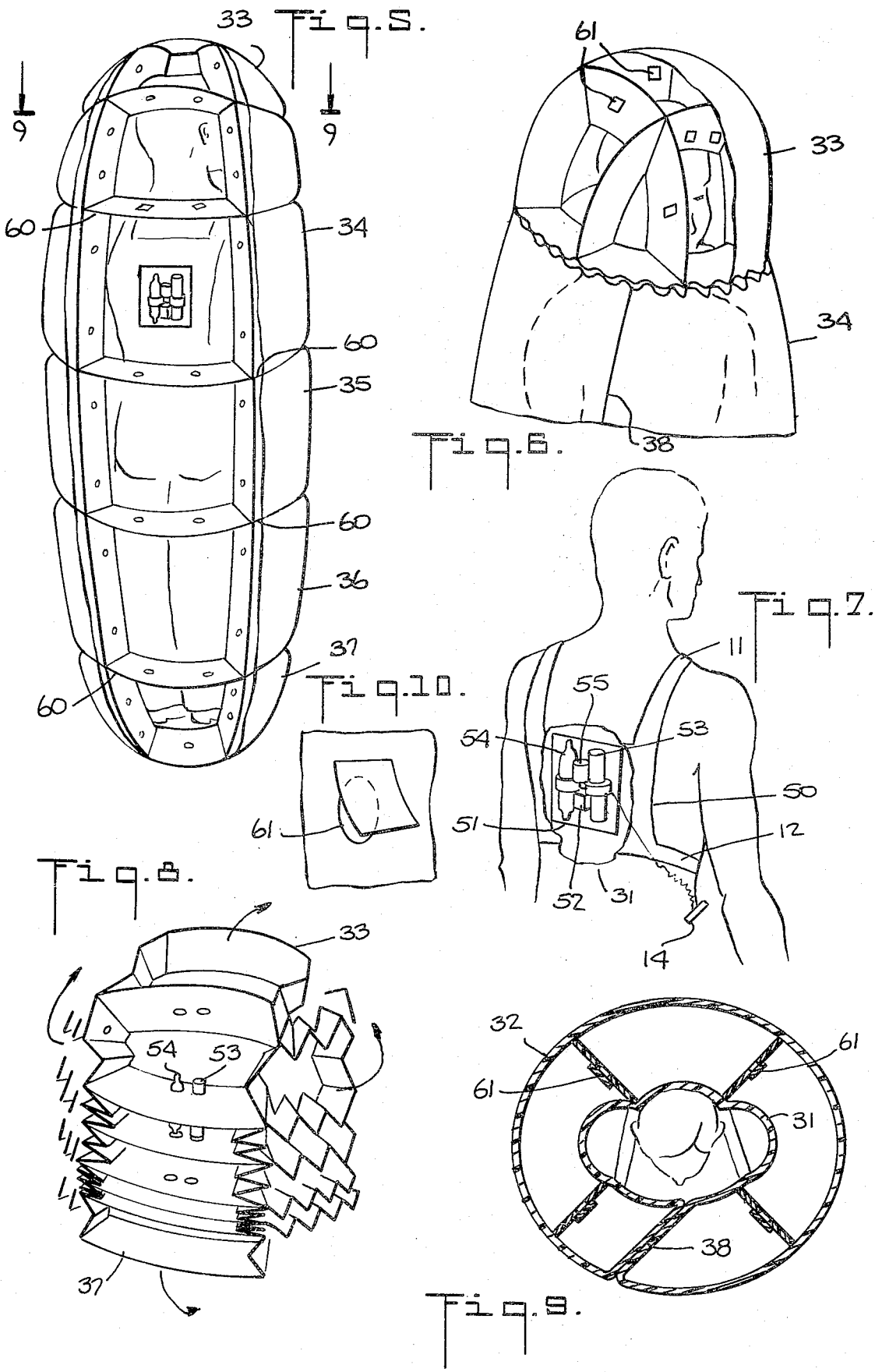

INFLATABLE SAFETY PACK

BACKGROUND OF THE INVENTION

This invention relates generally to an impact absorbing means, and more particularly to one which is inflatable to a predetermined shape to embrace and encapsulate a person or object therein.

Heretofore various attempts and systems have been devised to absorb the impact forces upon deceleration both of falling and horizontally moving bodies. Numerous attempts have been made in the areas of protecting human beings as well as other objects or cargo from such forces. Some of these prior art systems have employed inflatable cushioning devices which have met with varying degrees of success. The prior art includes devices which have been successful in providing the necessary structure for absorbing the impact forces but they have also been deficient in other areas.

For protecting objects or cargo from a vertical fall or drop, numerous devices exist such as those used for delivering supplies from aircraft, particularly those used by the military. Such prior art systems generally utilize a structure in association with a parachute. Even though the parachute decreases the rate of descent, the ultimate impact forces must be absorbed by means other than the supplies or cargo being dropped. The degree of force which can be absorbed naturally depends upon the cargo being delivered. These systems have frequently utilized inflatable bags deployed beneath the cargo as well as certain other prefilled cushioning means. In the case of the inflatable devices, the impact absorbing medium has generally been either a gaseous fluid or an expandable foam. Although these prior art devices, have, as already mentioned, met with a degree of success, most of them have been deficient in that they are expensive and limited for use in specific situation.

Most of the prior art devices intended to protect human beings were generally designed for aviators. More recently, systems directed at protecting people in automobiles and passengers in aircraft from injury in the event of a crash have been developed. In the latter situation, although numerous attempts have been made, the principal means utilized is still the parachute. Some of the attempts to provide suits or other protective type garments to shield against forces associated with a fall from any substantial height have failed because the devices were just not practical. For instance, it is generally not practical to wear a full body garment of the type necessary to absorb impact forces whether the person be a pilot or worker at a high altitude. Further, such systems heretofore were not justifiable on a cost basis. The only practical garment worn by people such as jet pilots is the conventional G-suit which in itself is not suitable for absorbing impact forces. Rather, the G-suit acts to protect the wearer during acceleration or deceleration from a loss of consciousness due to the uncontrolled flow of body fluids.

It is realized that substantial progress is being made in the areas of protecting humans from the forces developed during the crash of an automobile or an airplane. However, such devices are not suitable for the same purposes with which the applicant is concerned. In this connection, the applicant is primarily concerned with a means which will protect a person from a vertical fall of unlimited height and which will absorb the impact forces developed upon deceleration. Also, the system must be practical so that a worker may wear it while performing his normal functions without hinderance. Also, the means must be economical so as to justify its use. By the means disclosed herein, such a device is provided which overcomes the problems of the prior art and functions to protect either a person or other object from a vertical fall.

SUMMARY OF THE INVENTION

Briefly, stated, the invention disclosed herein provides an inflatable safety means adapted to protect an object or person against impact forces. The package includes in addition to a means for attaching it to the object to be protected, an inflatable means of a preformed shape. The preformed shape is predetermined dependent upon the object or person to be protected and is adapted to embrace and encapsulate the object or person when inflated. In this manner the object or person is protected and shielded from impact forces. The package further includes a means for inflating the inflatable means, which inflating means is responsive to a fall encountered by the person or object within the package. The inflatable means when in the deflated condition is enclosed by a frangible container.

In a more specific embodiment, the package of this invention is provided to protect a person against impact forces and includes a base having a strap means which extends about the person being protected in order to hold the base substantially fixed with respect to that person. An inflatable means is attached to the base and adapted to encapsulate the person upon inflation. The inflatable means thereby acts to absorb the impact forces and shield the person from such forces. Inflating means are provided which are responsive to a fall encountered by the person. The inflatable means is compactly supplied in the deflated condition in a suitable container.

Further embodiments of the invention include an explosive charge which releases the gaseous fluid used to expand the inflatable means. Also, an accelerometer may be utilized to sense the vertical fall and automatically activate the system. Further, as a precautionary measure manual means may be provided for activating the system.

In the instance where the system is utilized to protect a person, the package is provided on a base held with respect to the person by shoulder and waist straps. Onto the base, the accelerometer, explosive charge, supply of compressed gas and voltage source are mounted. The inflatable means is held to the base by a mounting plate, one layer of the inflatable means being sandwiched between the base and mounting plate.

The inflatable means is folded and stored within a frangible container of basically a cylindrical shape with closed ends. Upon activation, the frangible container is ruptured and falls away from the inflatable means which is then permitted to take its preformed shape and encapsulate the person wearing the pack of this invention.

In the specific embodiment, the inflatable means includes an upper, center and lower section. The center section, may as described, be divided in three separate sections making a total of five separate sections. Each of the sections is subdivided into smaller cells, each of which is independent of the other except for air passageways extending therebetween. Each of the major sections is mechanically coupled to one another preferably by means of heat seals. Also, one way valves are provided to allow the entry of gas into the respective sections as well as preclude any backflow of the gas out of the sections or cells. The one way valves are preferably registered with one another when the sections are deflated and folded upon each other. The sections themselves include an inner and outer layer attached to one another and are preformed so that when fully inflated they will act to encapsulate the person or object using the system.

In operation, the embodiment intended to be used by a person is strapped onto the person when working or otherwise present in an environment high above the ground. In the event that the person falls, once a predetermined level of acceleration is reached, the accelerometer activates the explosive charge and releases the supply of gas. The force exerted by this released gas causes the frangible container to rupture upon initial enlargement of the inflatable sections. The inflatable sections expand first vertically so as to substantially reach from the head to the feet of the person falling. Substantially simultaneously with the vertical expansion, the inflatable sections expand horizontally tending to encapsulate the person. In order to prevent the falling person from tumbling through the air, a small orientation parachute is provided on the package. The parachute is positioned so that the pack will land at its foot end and cause the person to fall backwards while impacting. The impact forces are absorbed by the inflated sections. Egress from the package is accomplished simply by exerting force along the seam in order to cause its opening. Additionally, means for releasing the pressure after impact may also be provided.

Accordingly, it is an object of this invention to provide an inflatable safety pack adapted to withstand impact forces and protect the person or object from such forces.

It is a further object of this invention to provide a safety means which will operate automatically during a vertical fall to encapsulate a person or object.

It is a still further object to provide a safety means adapted to protect either a person or other object which is compact and economical to produce while providing the necessary impact absorbing structure.

These and other objects, advantages and features of the invention will become more apparent from the following description taken in conjunction with the accompanying drawings.

BRIEF DESCRIPTION OF THE DRAWINGS

FIG. 1 is a perspective view of a worker wearing the inflatable safety pack of this invention;

FIG. 2 is a perspective view of the worker falling with the safety pack of this invention depicted in the initial stages of inflation;

FIG. 3 is a perspective view of the falling worker now partially embraced by the inflatable sections of this invention;

FIG. 4 is a perspective view of the falling worker fully embraced and encapsulated within the inflatable safety pack of this invention;

FIG. 5 is an elevation view of the inflated safety pack of this invention with a portion of the outer later removed;

FIG. 6 is a perspective view of the upper section of the inflated safety pack of this invention with the outer layer removed;

FIG. 7 is a perspective view of the attaching means and the manner in which the various components are mounted thereon;

FIG. 8 is a perspective view of the inflatable pack of this invention illustrating the initial inflation of the various sectional members;

FIG. 9 is a cross sectional view taken along the line 9—9 of FIG. 5; and

FIG. 10 is an enlarged perspective view of the one way passage valves connecting adjacent sections.

DESCRIPTION OF THE PREFERRED EMBODIMENT

Referring to the drawings, particularly FIGS. 1-4, the general operation of the inflatable safety pack of this invention is described. The safety pack 10 is illustrated as being worn by a person working at dangerous elevations and held in place by means of the straps 11 and 12 passing across the shoulders and waist respectively. It is noted, however, that the pack may also be used to protect delicate cargo or other supplies susceptible to damage from impact forces. However, the illustrative embodiment of the invention described herein is suitable for usage by personnel working at high altitudes. In the event that the pack of this invention is to be utilized in conjunction with supplies or other objects, the only basic change that need be made is to the preformed inflatable means which should be designed to conform to the shape of the object being protected. Further, the inventive concept as disclosed herein may readily be used by aviators, astronauts or other personnel subject to possible impact forces either from high altitude falls or horizontally moving bodies traveling at dangerous velocities. Also, the pack of this invention may be stored in buildings or otherwise supplied to victims such as those trapped in fires so that they may safely escape.

Referring now specifically to the FIGS. 1-4, the person wearing the safety pack 10 is illustrated in FIG. 1 performing his normal work duties while wearing the pack 10. Safety pack 10 is contained within a frangible container which, as illustrated, is substantially cylindrically shaped having end panels attached to a frangible skin to enclose the package in its deflated form. In FIG. 2, the worker is illustrated as falling with the pack 10 automatically opening and assuming the shape which will eventually absorb the impact forces upon landing. More specifically, the frangible container 20 which confines the inflatable sections 30 has been ruptured, the fragments illustrated at 20a, while the sections denoted generally as 30 have expanded longitudinally with respect to the wearer. Also, as illustrated, a small parachute 13 has been deployed which acts to orient the falling person and prevent uncontrolled tumbling through space. Referring next to FIG. 3, the parachute 13 is now more fully open and the inflatable sections 30, while being fully expanded longitudinally with respect to the wearer are now beginning to embrace and encapsulate the falling worker. In FIG. 4, the worker is illustrated as completely encapsulated within the inflatable sections 30 and oriented by the small parachute 13.

With reference now to the specific construction of the inflatable pack 10, reference is made to FIGS. 5-9. The pack when inflated is adapted to embrace the person wearing it in a manner illustrated in FIGS. 5 and 6. More specifically, in order to prevent injury at impact, it has been found that restricting movement of the person within the inflated sections is required. In this respect, the inner and outer layers 31 and 32, respectively, of the inflatable sections 30 are formed so that the inner layer 31 conforms to the contour of the person wearing the pack while the outer layer 32 is more or less ribbed due to the separate sections provided for absorption of the impact forces upon landing. The layers 31 and 32 are preferably of a flexible sheet material such a single ply polyethylene, Mylar or other plastic film having a suitable thickness.

The inflatable sections 30 as illustrated, comprise an upper head section 33, three side or body sections 34, 35 and 36, and a bottom or foot section 37. Each of these sections is further subdivided into cells or subsections, all in communication with each other by means of check valves to be discussed hereinafter. See for instance FIGS. 6 and 9. Thus, the particular cell receiving the greatest impact remains substantially resilient. However, complete mobility of the gas is precluded by the check valves and sectional structure.

Each of the sections 33–37 is adapted to be in abutting relation with the adjacent section and forms a substantially snug fit. However, the upper section 33 is corrugated at the surface which engages the adjoining section 34 as illustrated in FIG. 6, so that a sealing relationship between the two sections is not achieved. In this manner, the person within the expanded pack is provided with a source of air to facilitate breathing.

Longitudinal sealing is accomplished for the three center sections 34–36, in the manner illustrated in FIG. 9. This angularly disposed seam 38 is preferable in that it provides for protection of the person while yet allowing simple egress from the inflated pack 10 after impact. To remove himself from the inflated pack, the person merely exerts a relatively small force along the horizontal seam 38 pushing the wrap-around center sections counterclockwise as viewed in FIG. 9. In the event that this technique fails to function, perhaps because of the person being unconscious, means allowing the gas within the cellular structures to escape may be provided causing deflation within a predetermined time after impact.

Reference is made to FIGS. 7 and 8 for the specific construction of the pack 10. A base means 50 is provided with associated shoulder straps 11 adapted to pass around the wearer. Another strap 12 is provided at the lower portion of the base 50 and is adapted to pass around the waist of the wearer. In the center portion of the base 50 is attached a plate 51 having mounted thereto an accelerometer 52, an explosive charge 53, a supply of gaseous material 54 and a voltage source 55. The accelerometer 52 may be of any type adapted to sense changes in acceleration occurring during vertical falls. Such accelerometer is set to a predetermined level so that the system becomes activated during a substantial vertical drop. It is noted that other sensing means such as a pressure-responsive type or other suitable arrangements may be substituted. Means for turning the system on and off are also provided to prevent inadvertent activation such as might occur in a rapidly descending elevator. The explosive charge 53 may be in the form of any suitable pyrotechnic device arranged to be fired by means of an ignitor cap. This explosive charge 53 is adapted to release the gaseous material which is formed from the products of its combustion. Contained within the compartment 54 is a highly compressed gas which is released simultaneously with the gas from the explosive charge 53. These sources of gas complement each other, one being exothermic and the other endothermic, so that no extreme hot or cold temperature is realized. On the other hand, either inflating means can function safely and adequately without the other. The inner layer 31 of center section 34 is sandwiched between plate 51 and base means 50 in the manner shown. Once the plate is brought into abutment with the base, the entire inflatable structure is secured relative to the person being protected.

The inflatable sections 33–37 are mechanically connected to one another by means of heat sealing as illustrated at 60 provided between adjacent sections. Also provided is a check valve or one-way gas passage valve 61 (FIG. 10) which allows gas from the sources of supply 53 and 54 to enter into the various sections and subsections. If desired, however, a spinal column (not shown) may be provided to act as a conduit for the gaseous fluid. The sections furthest removed from the source of gas supply 54 i.e., upper and lower sections 33 and 37 respectively, are preferably adapted to be inflated first. This is accomplished as illustrated in FIG. 8 by arranging the check valves 61 so as to be held in registry with one another by means of the explosive charge 53 and supply of gaseous material 54. In this manner, the gases released by the explosive charge 53 first enter into the end sections 33 and 37 so as to initially effect a vertical expansion. Substantially, simultaneously, however, expansion also takes place horizontally to begin encapsulating the wearer. In order to insure an adequate supply of gas in the various sections a different number of valves may be provided for each section. However, it is noted that variable area check valves may be utilized to perform a similar function.

If desired, either an expandable foam material may be substituted for the gaseous fluid or it may be used in conjunction therewith. Expandable foam materials such as a polyurethane resin type may be used although others which are more energy absorbent are preferred.

The inflatable sections 33–37 as well as the plate 51 and the components mounted thereon are all housed within the outer cylindrical container 20. The cylindrical container 20 is closed at each end so as to confine the various inflatable sections in their deflated form. The container 20 is fabricated from a frangible material which is designed to rupture upon a slight inflation of the sections 33–37 so as to allow them to expand to the shapes previously described in conjunction with FIGS. 1–4. The sections 33–37, as illustrated in FIG. 8, are folded in an accordion manner upon one another so as to provide for a compact package.

In order to further provide the pack 10 described herein with additional safety features, a manual triggering device may be provided. Such a device is illustrated in FIG. 7 as 14 and is attached to the explosive charge 53. At one end of the manual triggering means 14 is a handle adapted to be grasped by the user. In order to prevent accidental triggering, a spring or other restricting device requiring a pull of approximately 25 pounds is provided.

Thus there has been described a pack adapted to be worn by a person working at a high altitude or otherwise placed about delicate supplies or other objects which might be subjected to impact forces. The pack is automatic, economical and adapted to absorb any harmful impact forces which would otherwise be transmitted to the object or person. Further, the pack is of a compact and convenient design so that it may be readily worn without any inconvenience and also provides the necessary safety features. Numerous other features and modifications such as substitution of expandable foams, variations in materials and configurations are of course possible. Therefore, although the above description is directed at a preferred embodiment of the invention, it is noted that other variations and modifications will be apparent to those skilled in the art and, therefore, may be made without departing from the spirit and scope of the present disclosure.

What is claimed is:

1. An inflatable safety package adapted to protect an object against impact forces which comprises:
   a. means for attaching said package to the object to be protected;
   b. inflatable means having a preformed shape adapted to embrace and encapsulate upon inflation the object to be protected thereby acting to absorb and shield the object from impact forces;
   c. means for inflating said inflatable means in response to a predetermined acceleration force encountered by the object being protected by said package; and
   d. frangible container means enclosing said inflatable means in the deflated condition adapted to rupture thereby releasing said inflatable means upon exertion of a predetermined force by the latter and having a substantially cylindrical shaped frangible outer skin embracing said inflatable means when deflated and closed end panels attached to each end of said outer skin.

2. An inflatable safety package in accordance with claim 1 wherein said inflating means comprises means for supplying gas, and sensing means responsive to acceleration forces coupled to said gas supplying means so that upon sensing a predetermined acceleration force said sensing means causes activation of said gas supplying means which in turn causes inflation of said inflatable means.

3. An inflatable safety package in accordance with claim 2 wherein said inflatable means includes a preformed upper, lower and center section which when inflated are in abutting relation with one another and fully encapsulate the object to be protected, means coupling each of said upper, lower and center sections to the section adjacent thereto while being in operative communication therewith, a plurality of one way valves at least one of which is disposed between each adjoining section to form a path in communication with each of said upper, lower and center sections respectively so as to allow the entry of gas to inflate each of said sections respectively while precluding any gaseous fluid in said sections from returning to said gas supplying means.

4. An inflatable safety package in accordance with claim 3 wherein each of said upper, lower and center sections are divided into at least three subsections separated from one another except for air passages which permit the flow of gas from one compartment to another.

5. An inflatable safety package in accordance with claim 1 wherein said attaching means comprises a base means and strap means adapted to extend around the object being protected and hold said package in a fixed relation thereto.

6. An inflatable safety package in accordance with claim 1 wherein said inflatable means is preformed so as to have a substantially greater length than that of said cylindrical shaped frangible outer skin and when packaged therein in the deflated condition is folded upon itself.

7. An impact absorbing inflatable safety package adapted to protect a person against impact forces which comprises:
   a. a base means;
   b. strap means coupled to said base means adapted to extend about the person and hold said base means with respect to the person;
   c. inflatable means attached to said base means including a preformed upper, lower and center section which when inflated are in abutting relation with adjacent sections and fully encapsulate the person wearing the package, means coupling each of said upper, lower and center sections to the section adjacent thereto while being in operative communication therewith, a plurality of one way valves at least one of which is disposed between each adjoining section to form a path in communication with each of said upper, lower and center sections respectively so as to allow the entry of gas to inflate each of said sections respectively while precluding any gaseous fluid in said sections from returning to an adjoining section, said lower and center sections being adapted upon inflation to form a sealing surface therebetween, and at least one of said upper and center sections being provided with an abutting corrugated surface so as to permit the entry of air into the inner portion of said package;
   d. means for inflating said inflatable means in response to a fall encountered by the person utilizing said package; and
   e. container means enclosing said inflatable means in the deflated condition.

8. An impact absorbing inflatable safety pack adapted to be worn by a person and protect the person against impact forces associated with vertical falls from high elevations which comprises:
   a. a base means;
   b. strap means attached to said base means and adapted to extend about the person and hold said base means with respect to the person;
   c. inflatable means attached to said base means including means for supplying a gaseous fluid, an upper, lower and center section adapted to encapsulate the head, legs and body of the person wearing said pack upon inflation respectively, means coupling each of said upper, lower and center sections to the adjacent section while in operative communication therewith so as to permit the flow of said gaseous fluid, a plurality of one way valves at least one of which is disposed between each adjoining section to form a path in communication with each of said upper, lower and center sections respectively so as to allow the entry of gas to inflate each of the sections while precluding any gaseous fluid in said sections from returning to said supply means;
   d. sensing means responsive to increased velocities encountered by the person wearing said pack adapted to release said gaseous fluid supplying means upon a predetermined increase in vertical velocity so as to cause inflation of said inflatable means in response to a fall of the person wearing said package; and
   e. frangible container means enclosing said inflatable means in the folded and deflated condition, said frangible container means being adapted to rupture and release said inflatable means upon exertion of a predetermined force caused by the inflation of the latter.

9. An impact absorbing inflatable safety package adapted to protect a person against impact forces which comprises:
   a. a base means;
   b. strap means coupled to said base means adapted to extend about the person and hold said base means with respect to the person;
   c. inflatable means attached to said base means, adapted to encapsulate the person upon inflation and thereby aid in absorbing impact forces, said inflating means including an explosive charge adapted to relese a supply of gas, and sensing means responsive to acceleration forces coupled to said explosive charge so that upon sensing a predetermined acceleration force said sensing means causes activation of said explosive charge and releases said supply of gas to commence inflating said inflatable means;
   d. means for inflating said inflatable means in response to a fall encountered by the person utilizing said package;
   e. container means enclosing said inflatable means in the deflated condition; and
   f. a supply of compressed gas in operative communication with said sensing means, and a mounting plate adapted to engage and hold a portion of said inflatable means in an abutting relating to said base means, said plate having said explosive charge, sensing means and supply of compressed gas mounted thereon and positioned within said inflatable means.

10. An inflatable safety package in accordance with claim 9 wherein said inflatable means includes a preformed upper, lower and center section which when inflated are in abutting relation with adjacent sections and fully encapsulate the person wearing the package, means coupling each of said upper, lower and center sections to the section adjacent thereto while being in operative communication therewith, a plurality of one way valves at least one of which is disposed between each adjoining section to form a path in communication with each of said upper, lower and center sections respectively so as to allow the entry of gas to inflate each of said sections respectively while precluding any gaseous fluid in said sections from returning to an adjoining section.

11. An inflatable safety package in accordance with claim 10 wherein said lower and center sections are adapted upon inflation to form a sealing surface therebetween, and at least one of said upper and center sections is provided with an abutting corrugated surface so as to permit the entry of air into the inner portion of said package.

12. An inflatable safety package in accordance with claim 10 wherein said one way valves are maintained in alignment with one another when said upper, lower and center sections are in the deflated condition so that upon inflation said upper and lower sections initial expansion is primarily in the vertical direction.

13. An impact absorbing inflatable safety package adapted to protect a person against impact forces which comprises:
   a. a base means;
   b. a mounting plate;
   c. strap means coupled to said base means adapted to extend about the person and hold said base means with respect to the person;
   d. inflatable means attached to said base means adapted to encapsulate the person upon inflation and thereby aid in absorbing impact forces, said inflatable means including an inner and outer skin attached to one another, said inner skin being of a preformed configuration adapted to snugly confine the person wearing said package upon inflation, said outer skin having substantially the same preformed configuration as said inner skin, and wherein said inflatable means is attached to said base means by said mounting plate holding said inner skin in abutting relation therewith;
   e. means for inflating said inflatable means in response to a fall encountered by the person utilizing said package; and
   f. container means enclosing said inflatable means in the deflated condition.

14. An impact absorbing inflatable safety package adapted to protect a person against impact forces which comprises:
   a. a base means;
   b. strap means coupled to said base means adapted to extend about the person and hold said base means with respect to the person;
   c. inflatable means attached to said base means adapted to encapsulate the person upon inflation and thereby aid in absorbing impact forces;
   d. means for inflating said inflatable means in response to a fall encountered by the person utilizing said package; and
   e. container means enclosing said inflatable means in the deflated condition, said container means including a substantially cylindrical shaped frangible outer skin embracing said inflatable means when deflated and adapted to rupture thereby releasing said inflatable means upon exertion of a predetermined force caused by inflation of said inflatable means.

* * * * *